Figure 3:
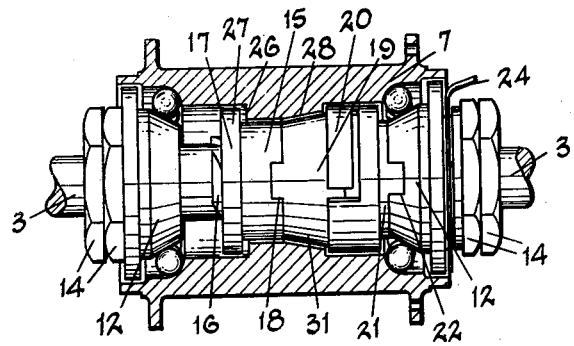

June 17, 1941.  J. P. SCHMITZ  2,246,191
VEHICLE DRIVE
Filed Nov. 25, 1939   2 Sheets-Sheet 1
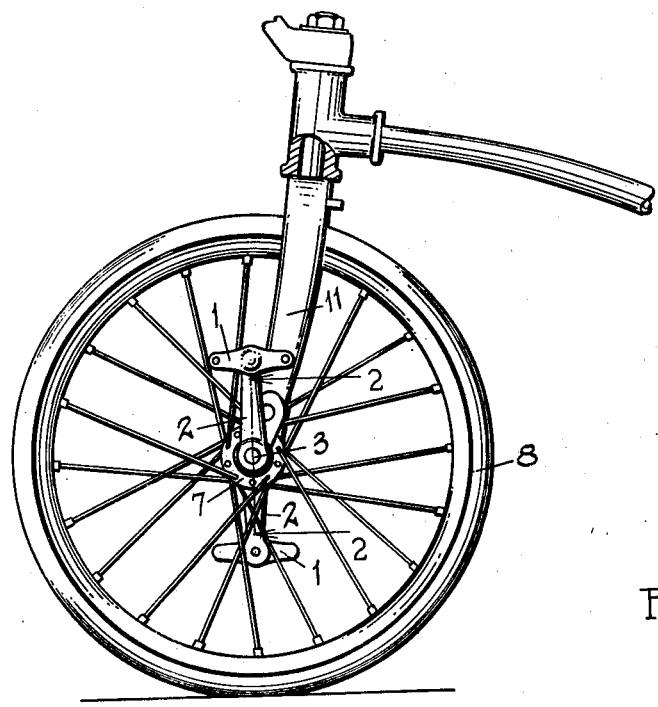
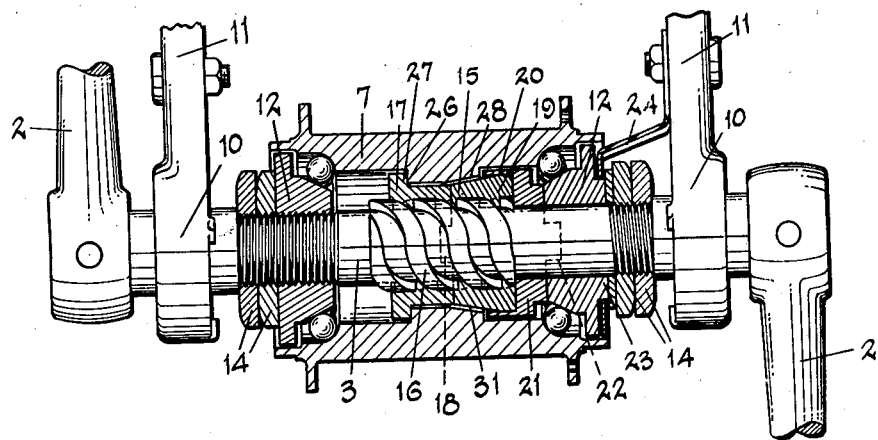
Inventor
Joseph P. Schmitz
By Faust F. Crampton
Attorney June 17, 1941.  J. P. SCHMITZ  2,246,191
VEHICLE DRIVE
Filed Nov. 25, 1939  2 Sheets-Sheet 2

Inventor
Joseph P. Schmitz
By Faust F. Crampton
Attorney

Patented June 17, 1941

2,246,191

UNITED STATES PATENT OFFICE 2,246,191

VEHICLE DRIVE

Joseph P. Schmitz, Tiffin, Ohio

Application November 25, 1939, Serial No. 306,149

1 Claim. (Cl. 192—64)

My invention relates to a driving mechanism for a foot-powered vehicle, such as a velocipede. The invention, particularly, relates to a velocipede driving mechanism for transmitting a driving force from a pedal-operated driving element to a driven wheel to enable the vehicle to be driven in forward or backward directions; to coast, in either direction, independently of the driving element; and to be speed-controlled, in either direction, according to the operator's manipulation of the pedal-operated driving element.

My invention has for its object to provide a foot-powered vehicle drive having a means for operatively connecting the driving element to the driven element, the means being operated to connect the elements by rotation of the driving element in either direction. A further object of the invention is to provide said means with one part for engaging the driven element when the driving element is rotated in one direction and another part for engaging the driven element when the driving element is rotated in the other direction. Thus, the rotation of said driven element, in one or another direction, is effected by the engagement of one or another of said parts with said driving element and the rotation of the driving element in said direction.

The invention has for a further object to provide means for shuttling said means to and from engagement with said driven element and for maintaining said means in a position so that neither of its said parts are in engagement with the driven element, permitting the driven element to rotate freely of the driving element. Thus, the vehicle, on which the drive mechanism of my invention is applied, may coast and, by operation of the driving element in a direction opposite to that of coasting, the speed of such coasting may be controlled and, if desired, be effectively stopped.

A still further and particular object of the invention is to provide a drive mechanism partaking of the advantageous objects referred to above and having a simple, durable, and inexpensive construction in keeping with the use and cost of vehicles of the character to which the drive mechanism is particularly adaptable.

The invention consists in other features and advantages which will appear from the following description and upon examination of the drawings. Structures containing the invention may partake of different forms and still embody the invention. To illustrate a practical application of the invention, I have selected a vehicle drive as an example of the various structures and details thereof that contain the invention and shall describe the selected structures hereinafter, it being understood that variations may be made without departing from the spirit of the invention. The particular structure selected is shown in the accompanying drawings and described hereinafter.

Figure 4:
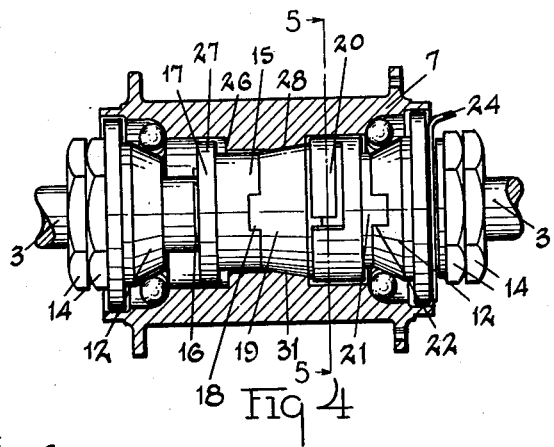
Figure 5:
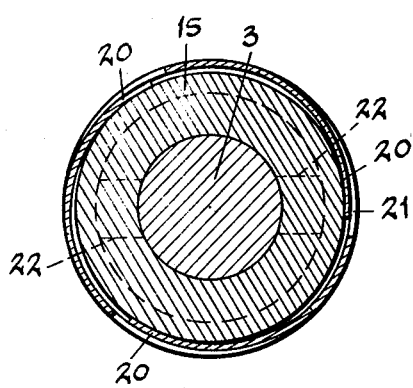

Fig. 1 of the accompanying drawings illustrates an embodiment of my invention in a vehicle drive, as adapted to a child's velocipede. Fig. 2 illustrates an enlarged view of a section taken on the plane of the line 2—2, indicated in Fig. 1. Fig. 3 illustrates a partial sectional view of certain parts of the vehicle drive, in one position where certain functions are performed. Fig. 4 is a view, similar to that illustrated in Fig. 3, except that the parts are shown after movement to another position than that of Fig. 3, to perform a different function than that being performed by the parts shown in Fig. 3. Fig. 5 illustrates a view of a section taken on the plane of the line 5—5, indicated in Fig. 4.

A velocipede, to which a drive mechanism, embodying the features of my invention, may be applied, has the usual foot-powered pedals 1 and crank arms 2 for rotating an axle 3. The axle 3 supports a hub 7 of a driven power wheel 8. The axle 3 may be journalled in bearings 10 located in the ends of a forked frame 11, in a manner well known in the art. If desired, ball bearings are mounted in races formed by the conical shoulders of collars 12 and the ends of the hub 7, to support the hub 7 for free rotation relative to the axle 3. The collars 12 may be secured on the axle 3 by lock nuts 14.

In order to cause rotation of the wheel 8 when the axle 3 is rotated by the pedals 1, a means is provided and supported on the axle 3 in a position to operatively interconnect the axle 3 to the hub 7 of the said wheel. Said means may be embodied in a member 15 mounted on the axle 3. If desired, the member 15 may be formed, for convenience of assembly, by two collar parts 17 and 19 keyed together by suitable interfitting portions 18 so as to move in unison along the axle 3. The member 15 has internally-formed female square threads, which engage and thread onto a male square threaded portion 16, located on the surface of the axle 3. Thus, as the axle is rotated, in a counter-clockwise direction, that is, when the top of the surface of the axle 3, as shown in Fig. 2, moves forward, with respect to the sheet on which the figure is presented, the member 15 will be urged leftwardly along the axle, as shown in Fig. 2 of the accompanying drawings, and rightwardly, as the axle is rotated in a clockwise direction.

In order to prevent rotation of the member 15 and to assure axial movement thereof along the axle 3, upon rotation of the axle, spring clip finger portions 20, which may extend from an annular band secured to a circular block 21, slidably engage the surface of the member 15. The circular block 21 may be locked against rotative movements by the engagement of interfitting portions 22 formed in the block 21 and the adjacent bearing collar 12, which is provided on its outer surface with a squared shank 23. The squared shank is located in, and its edges are engaged by, a plate 24 that may be secured by a bolt connection to one of the legs of the forked frame 11. Thus, as the axle is rotated, the member 15 will be urged axially along the threaded portion 16 of the axle 3 in one or another direction, according to the direction of rotation of said axle.

The member 15 is provided with spaced parts, having surfaces of predesigned form, which engage parts on the driven element, having surfaces of predesigned form, when the member 15 is moved toward the rightward and leftward extremities of its motion in those directions by the rotation of the axle 3. In the particular construction illustrated in the accompanying drawings, the hub 7 has an annular, internal chamfered surface 28, and the member 15 is provided with a tapering portion 31. Thus, when the axle 3 is rotated in a counterclockwise direction, the member 15 is moved axially along said axle 3 to cause frictional engagement of the surface of the portion 31 of the member 15 with the surface 28 of the hub 7. Continued rotation of the axle 3 by the cranks 2, establishes a frictional seizure between the portion 31 and surface 28 to produce rotation of the wheel 8 and forward motion of the velocipede.

The hub 7 is, likewise, provided with an internal, annular shoulder portion 26 located in axially spaced relation to the chamfered surface 28, and the member 15 has an annular flange 27 located in axially spaced relation to the tapering portion 31. Thus, when the axle 3 is rotated in a clockwise direction, the member 15 is moved axially along said axle 3 to cause the annular flange 27 to abut and frictionally engage the shouldered portion 26 of the hub 7. Continued rotation by the crank arms 2 and axle 3 establishes a frictional seizure between the flange 27 and the shoulder 26 to produce rotation of the wheel 8 and rearward motion of the velocipede.

The spacing between the parts 27 and 31 of the member 15 is so related to the spacing between the shoulder 26 and chamfered surface 28 of the hub 7, that the member 15 may be moved on the axle 3 to positions where neither of the parts 27 nor 31 engage their respective and cooperating hub parts. When the member 15 is so located, either by the operator's directive manipulation of the foot pedals or automatically, by reason of the wheel 8 rotating faster than the axle 3, as when rolling down an incline, the wheel 8 is disconnected from the axle and pedals and may coast independently thereof in either direction.

When it is desired to brake the motion of the wheel 8, the crank arms 2 may be rotated in a direction opposite to that in which the wheel is then rotating. The initial effect of such action will cause movement of the member 15 along the axle 3 to produce engagement of the portion 31 with the chamfer 28, if the vehicle is moving rearwardly, or engagement of the flange 27 with the shoulder 26, if the vehicle is moving forwardly. The continued rotation of the crank arms 2 in opposition to the rotation of the wheel 8, will result in slowing and eventual stopping of the vehicle.

Thus, it is apparent that a drive mechanism, containing the features of my invention, will permit of coasting in either direction without rotation of the axle or limitation of driving the vehicle to but one direction.

I claim:

In a drive mechanism for a foot-powered vehicle, a wheel for driving the vehicle; a hub for rotatably supporting the wheel; the hub having formed thereon an internal annular shoulder portion and a chamfered portion in spaced relation to the annular shoulder portion; an axle supported on the vehicle for rotation in either direction and extending in concentric relation through the hub; a member supported for shuttling axial movement on said axle; the member having formed thereon a flange part and a tapering portion in spaced relation to the flange part; the axle having a threaded portion adapted to engage said member and to cause axial movement of same in either direction whereby the flange part will engage the shoulder part, when the axle is rotated in one direction, to drive the wheel in said direction, and the tapering portion will engage the chamfered part, when the axle is rotated in the other direction, to drive the wheel in said other direction.

JOSEPH P. SCHMITZ.